US011049207B1

United States Patent
Weldon et al.

(10) Patent No.: US 11,049,207 B1
(45) Date of Patent: Jun. 29, 2021

(54) EARLY FRAUD DETECTION SYSTEM

(71) Applicant: United Services Automobile Association (USAA), San Antonio, TX (US)

(72) Inventors: Duane E. Weldon, San Antonio, TX (US); Neil Allen Dobbs, San Antonio, TX (US); Michael Funderburk, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 1510 days.

(21) Appl. No.: 14/978,608

(22) Filed: Dec. 22, 2015

Related U.S. Application Data

(60) Provisional application No. 62/096,105, filed on Dec. 23, 2014.

(51) Int. Cl.
*G06Q 50/26* (2012.01)
*H04L 29/06* (2006.01)

(52) U.S. Cl.
CPC ....... *G06Q 50/265* (2013.01); *H04L 63/1425* (2013.01); *H04L 63/1441* (2013.01)

(58) Field of Classification Search
CPC ............ H04L 63/1425; H04L 63/1441; G06Q 50/265
See application file for complete search history.

(56) References Cited

U.S. PATENT DOCUMENTS

| | | | | |
|---|---|---|---|---|
| 6,092,102 A * | 7/2000 | Wagner | .................. | G06Q 10/10 340/7.29 |
| 7,971,246 B1 * | 6/2011 | Emigh | .................... | G06F 21/56 726/22 |
| 2005/0228996 A1 * | 10/2005 | Mayer | ...................... | H04N 1/32 713/170 |
| 2010/0115114 A1 * | 5/2010 | Headley | .................. | G06F 21/32 709/229 |
| 2012/0130898 A1 * | 5/2012 | Snyder | ................... | G06Q 20/32 705/44 |
| 2012/0265828 A1 * | 10/2012 | Slepinin | .............. | H04L 63/0428 709/206 |
| 2014/0179360 A1 * | 6/2014 | Jackson | .................. | H04W 4/14 455/466 |
| 2014/0245374 A1 * | 8/2014 | Deerman | ................ | H04L 63/20 726/1 |

(Continued)

OTHER PUBLICATIONS

MailTracking.com. Retrieved from the Wayback machine as of Jan. 25, 2013. Accessed: Sep. 22, 2018. <http://www.mailtracking.com/mailtracking/about.asp> (Year: 2013).*

*Primary Examiner* — Lynda Jasmin
*Assistant Examiner* — Shaun D Sensenig
(74) *Attorney, Agent, or Firm* — Fish & Richardson P.C.

(57) ABSTRACT

Methods, systems, and apparatus, including computer programs encoded on computer storage media, for an early fraud detection system. One of the methods includes generating a tracker for a personal communication with a user. The method includes transmitting the personal communication to the user. The method also includes receiving a request identifying the tracker, wherein the request originates from an address. In addition, the method includes detecting a potential security breach based on the address.

36 Claims, 3 Drawing Sheets

(56) References Cited

U.S. PATENT DOCUMENTS

2015/0172321 A1\* 6/2015 Kirti ...................... H04L 63/20
 726/1
2015/0262193 A1\* 9/2015 Carvalho ........... G06Q 30/0185
 705/318

\* cited by examiner

EARLY FRAUD DETECTION SYSTEM

CROSS-REFERENCE TO RELATED APPLICATIONS

This application claims priority to U.S. Provisional Patent Application 62/096,105, filed on Dec. 23, 2014, entitled "EARLY FRAUD DETECTION SYSTEM," incorporated herein by reference in its entirety.

BACKGROUND

Identity theft and other forms of cybercrime cost the economy hundreds of billions of dollars. Malicious individuals may seek to steal a person's identity using different methods and perform illegal actions such as improperly acquiring services, goods, and money using the stolen confidential information. Many people may be unaware that their identity has been compromised and do not take appropriate actions in a timely manner to prevent negative impacts. These compromises may lead to subsequent damage to their finances, security, and reputation as well as waste of time and resources for fighting identity theft.

SUMMARY

In general, one innovative aspect of the subject matter described in this specification can be embodied in methods that include the actions of generating a tracker for a personal communication with a user. The methods include the actions of transmitting the personal communication to the user. The methods include the actions of receiving a request identifying the tracker, wherein the request originates from an address. The methods include the actions of detecting a potential security breach based on the address.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. The tracker may include a unique identifier that does not include personally identifiable information of the user. The personal communication may be an email or a link to a web page. The personal communication may include a reference to a resource located on a computer system or is configured to send a message to the computer system in response to the personal communication being opened. The address may be an IP address. After generating the tracker for the personal communication with the user, the methods may include the actions of storing information associating the tracker with the user in a database. The information may include the unique identifier and personally identifiable information of the user associated with the unique identifier. Detecting the potential security breach may include identifying a provider known to be associated with security breaches based on the address or identifying a country of origin based on the address. Detecting the potential security breach may include identifying that the request including the tracker was blocked. Identifying that the request was blocked may include processing log files associated with a content server. Detecting the potential security breach may further include identifying that the user is a high value target and sending an alert to a fraud detection unit. In response to detecting the potential security breach, the methods may include the actions of accessing personally identifiable information about the user from the database using the unique identifier, identifying one or more communication channels based on the personally identifiable information, transmitting the alert via the one or more communication channels to the user or a customer service representative, and suggesting one or more actions to the user to remedy the potential security breach. The one or more actions may include changing passwords, changing security questions, deleting email-related traces from temporary files, establishing a secondary email address, enabling two factor authentication, and notifying authorities.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Identity theft and other forms of cybercrime cost the economy hundreds of billions of dollars. Unauthorized individuals steal a person's identity and use the stolen identity to open lines of credit, steal money from bank accounts, and performing other illegal actions. Once a person has been determined to be victim of identity theft, the person can take steps to stop any subsequent damage to their finances, security, and reputation.

A substantial percentage of the cybercrime occurring originates from a subset of different geographical locations. By identifying communication originating at one of these locations early, identify theft can be addressed quickly, potentially before the victim suffers loss. For example, if a system can determine that a confidential communication is being read from a high fraud area, the system can warn the potential victim of the potential security breach.

Figure 1:
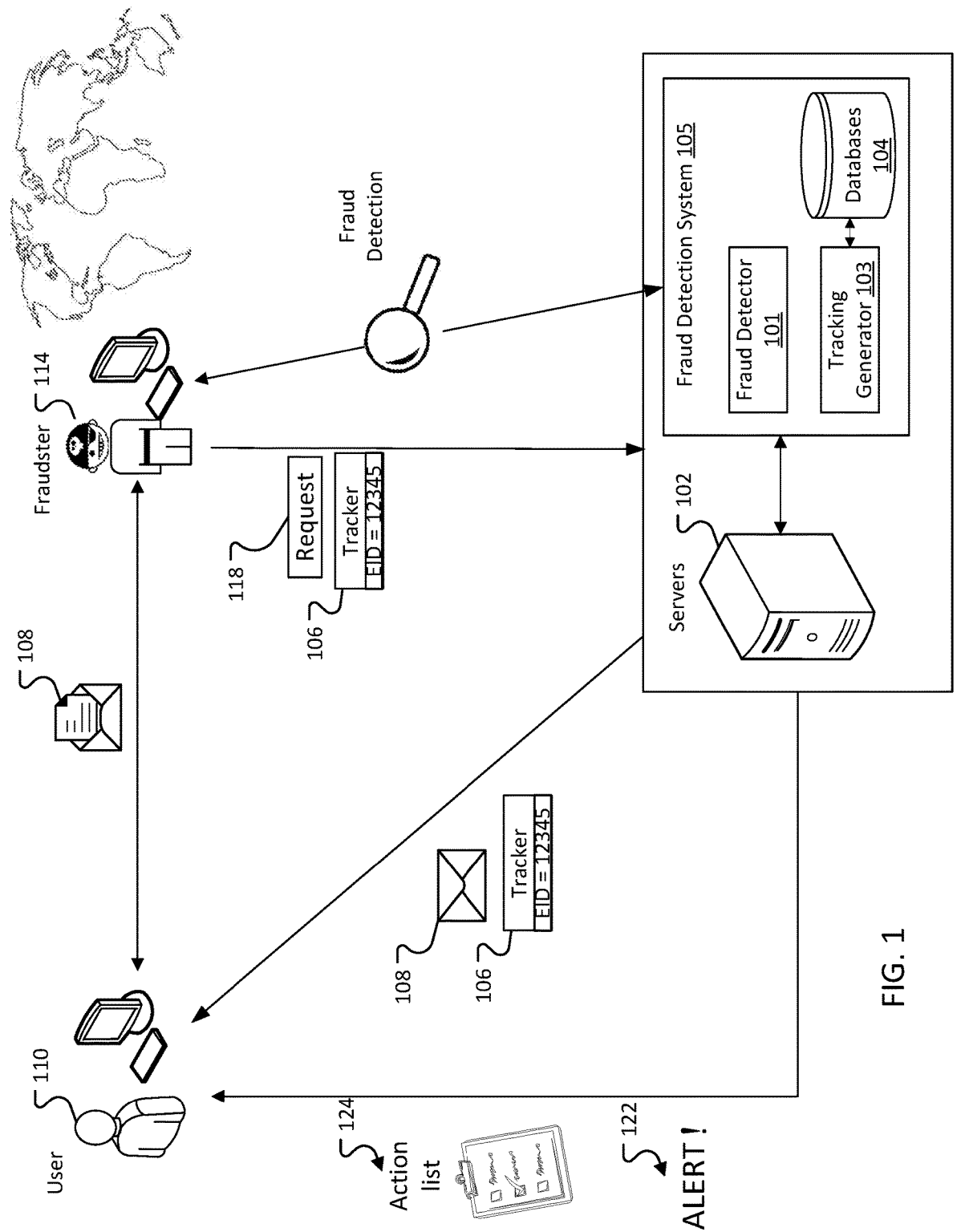
FIG. 1 illustrates an example of an environment for early fraud detection.

FIG. 1 illustrates an example of an environment for early fraud detection. The environment can include servers 102 and a fraud detection system 105. The servers 102 can include email servers and/or content servers. The fraud detection system 105 can include a tracking generator 103, databases 104, and a fraud detector 101. A company may wish to send a personal communication to a user via a network (for example, the Internet). In some implementations, the personal communication is an email or a link to a web page. In order to improve the company's ability to detect fraud, the company can track the location where the email is read.

In order to uniquely identify an email, the tracking generator 103 can generate a tracker which can be embedded into the personal communication. The tracker may include a unique identifier (ED) that can be used to uniquely identify the personal communication. In order to protect the privacy of the user, the EID may not include personally identifiable information. Instead, the EID can be associated with the personally identifiable information in one or more databases (for example, databases 104). The one or more databases can be distributed over the network. The personally identifiable information of the user may include information such as the user's name, email address, home address, account information, and/or phone number. In this example, a tracker 106 is generated for an email 108 to be sent to a user 110. The tracker 106 includes an EID "12345". Information associating the EID "12345" with the user 110 (e.g., John Smith of Penny Lane) can be stored in the databases 104. Once the information associating the EID with the user is stored, the tracker is embedded in the email and the servers 102 transmit the email to the user via the network. When the email is opened, the tracker transmits a message that includes the EID and a location back to the servers, for example, using a Hypertext Transfer Protocol (HTTP) request. The HTTP request includes an Internet Protocol (IP) address associated with the computer sending the request. The message may be an HTTP request for an object, such as a graphical image of a company logo, a small 1 pixel image, a request for a CSS style sheet, etc. The requested object can be used in the presentation of the email. Alternatively, the message may be a custom HTTP request generated by a script embedded into the email.

In order to protect the user from identify theft and other forms of security breaches, the company can block a number of IP addresses that are known to be associated with security breaches. The company may also be required by law to block IP addresses originating from certain countries (for example, countries specified by the United States Department of the Treasury's Office of Foreign Assets Control). The blocked IP addresses cannot be used to access the company's websites and other network-based systems (e.g. a mobile application for online banking). However, the blocked IP addresses can still be used by a fraudster to improperly access the user's email as the first step toward stealing the user's identity and performing other illegal actions (e.g., opening a line of credit, accessing the user's bank account, etc.).

FIG. 1 illustrates two scenarios, in the first, the email is opened by the intended recipient (e.g. the user 110) from a safe location, and in the second, the email is opened by a fraudster from a blocked IP address. In both scenarios, upon the email being opened, the servers 102 receives a message transmitted by the tracker using an HTTP request. As discussed above, the HTTP request includes an IP address associated with the requesting computer. In the scenario where the email is opened by the user 110, the fraud detection system 105 can verify that the email was opened from a safe location based on the IP address included in the HTTP request. The servers 102 then fulfill the request, for example, by allowing a graphical image to be downloaded from the servers and presented in the email. In the scenario where the email is opened by a fraudster from a blocked IP address, the HTTP request is blocked by a web server or a content delivery network (CDN) service provider who monitors and manages the company's email traffic. In some implementations, the CDN sends a block notice to the servers 102. In some implementations, a component in the fraud detection system 105 (for example, the fraud detector 101) can identify that the HTTP request was blocked by the web server or CDN and then detect a potential security breach by processing log files associated with content servers. The log files may be generated by the CDN, the servers 102, or a combination of both. The blocked request may not be fulfilled, and the email may or may not have a visual indication that the request failed.

In response to identifying the blocked request, the fraud detection system 105 can generate an alert (122) regarding the potential security breach. The fraud detection system 105 can retrieve the personally identifiable information of the user from the databases 104 using the EID (e.g. EID "12345") included in the received message. The fraud detection system 105 can identify one or more alternative channels to communicate with the user. The alternative channels may be identified based on the retrieved user information. The fraud detection system 105 can also trigger an alert within the company or organization, for example, by sending a message to a fraud department, customer service representative, etc. The fraud detection system 105 can transmit the alert via the one or more alternative channels to the user and/or relevant people.

The one or more alternative channels may include short message service (SMS) text message, multimedia message service (MMS) message, telephone call, Voice-over-IP (VoIP) communication, social media platform notification systems, mobile phone push notifications, other mobile device notification systems, and email to a secondary email address. The fraud detection system 105 can also temporarily suspend the company controlled account (e.g. bank accounts, credit cards, etc.) of the user who has potentially been compromised. The fraud detection system 105 can also suggest an action list (124) including one or more actions to remedy the potential security breach. For example, the one or more actions may include changing passwords, changing security questions, deleting email-related traces from temporary files, establishing a secondary e-mail address, enabling two factor authentication, and notifying authorities. The fraud detection system can provide these suggestions to the user via an alternative channel.

While conventional methods only notify the user about a potential fraud after detecting an unusual action on the user's account (e.g. a password change), the embodiments of the current subject matter can allow the company and the user to stop the fraud at an early stage. For example, when the user's email is attempted to be opened by the fraudster from an unsafe location. If the fraud is not detected and stopped early, further damages such as account takeover due to identity theft may be caused. By stopping the fraud early, the company and the user can avoid a large amount of time, resources, and money involved in fighting identity theft and resolving other privacy and security problems. The company can further improve the company reputation, protect the company's brand, and increase users' confidence.

In some implementations, the embodiments of the current subject matter can be used for national security purposes. For example, the company may have users who may require special handling such as heads of state, heads of government, government personnel (including military and domestic) and other politicians. For example, for each email sent to an individual in a group of individuals who require special handling, the tracking generator 103 can generate a tracker with an EID number that is encoded to identify the group. For instance, the EID number may end in a specific digit such as a 9. Alternatively, the EID number may have a particular checksum. By assigning a specific EID number for each group of users, the fraud detection system 105 can monitor email activities of a particular group within a predetermined period. For example, the system 105 can obtain information about devices that have accessed emails belonging to users in a particular group over the last 30 days. The information may include, for example, location, time, and duration that the emails have been opened and read. Based on the information, the system 105 can detect whether any of these emails are likely compromised and read from blocked IP addresses or countries, and if so the system 105 can notify relevant people and/or agencies about a potential fraud so that a prompt and appropriate action can be executed to stop the fraud at an early stage. This specific action can help to prevent highly important information from leaking out, which may trigger potential national security threats.

In some implementations, users may be flagged for special handling in the company's systems. When the fraud detection system detects a blocked request, the fraud detection system can check user information associated with a user to determine if the user is flagged for special handling. If the user is flagged for special handling then the fraud detection system can raise additional alerts or alters through additional channels.

In some implementations, the fraud detection system can include a user customization system that allows the user to provide a list of known good locations and/or access methods. For example, the user may identify that they access the network using an anonymous routing network using a laptop. The information can include time zones, access times, access patterns and/or types of devices, browsers, applications, systems, medium or other related information. The user customization system can further allow the user to generate a list of safe and/or unsafe locations that are used in addition to the locations that are known to be associated with fraud. The information provided by the user can help the fraud detection system identify unusual activities associated with potential security breaches.

While this specification contains many specific implement details related to email account compromise, embodiments of the subject matter and the functional operations described in this specification can be applied to other network technologies such as cloud storage, social media or any authenticated or traceable medium to which account takeover, unauthorized access or miss-representation is the goal of fraudsters.

Figure 2:
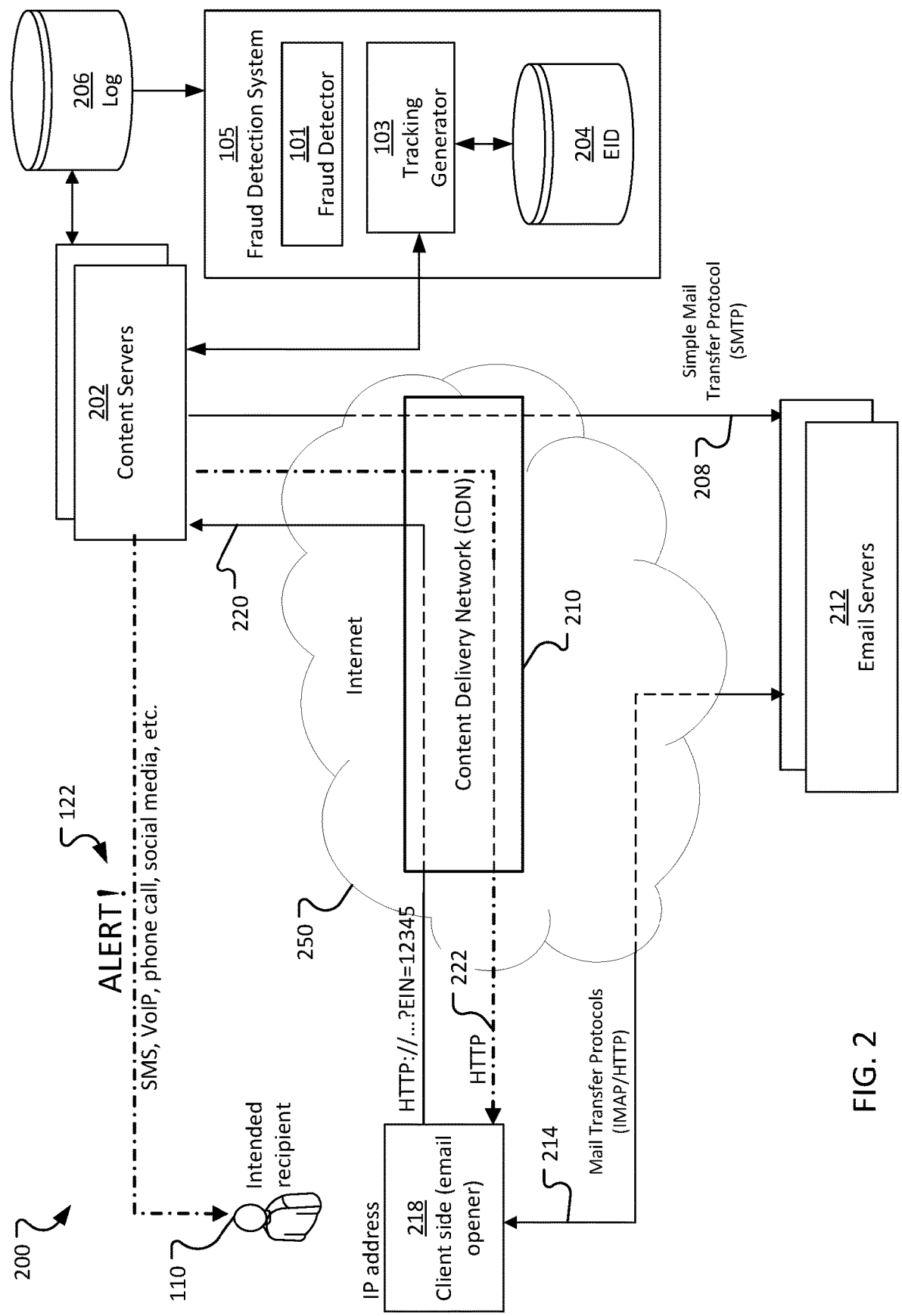
FIG. 2 illustrates an example of a simplified system architecture for early fraud detection.

FIG. 2 illustrates an example of a simplified system architecture 200 for early fraud detection. The system architecture 200 includes content servers 202, email servers 212, and a client side computer 218. In general, a content servers 202 can include any system that is intended to provide content to an end user. Examples of content servers include an email marketing systems, web webservers, streaming video services, etc. The content servers 202 are connected with the fraud detection system 105 that includes the tracking generator 103, unique identifier (ED) databases 204, fraud detector 101, and log databases 206. While in this example, the fraud detector 101 is included in the fraud detection system 105, the fraud detector can be executed as a separate process executing on a separate computer or may be integrated into another process executing on the content servers 202 or other computer systems. For example, in one implementations, the fraud detector can be integrated to auditing software (not shown). The components of the system architecture can communicate with each other by exchanging messages through the Internet 250. In some implementations, communication messages going in and out of the content servers 202 are delivered by a content delivery network (CDN). A CDN is a network of geographically distributed content delivery servers that are set up for faster, more efficient delivery of digital content (e.g. email content, web content, streaming media, etc.) to end-users. A CDN can be provided by a content delivery network service provider. In this example, an email sender (e.g. the company as mentioned above with respect to FIG. 1) wants to send an email to an email recipient (e.g. the user 110). First, the content servers 202 request the tracking generator 103 to generate a tracker and embed it in the email. As discussed above with respect to FIG. 1, the tracker includes a unique identifier (EID) that is used to uniquely identify the email. The EID is mapped to personally identifiable information of the intended email recipient (e.g. the user 110) stored in the EID databases 204. The content servers 202 then transmit the email with the tracker to the email servers 212 via the CDN using Simple Mail Transfer Protocols (SMTP) (208). When an email opener at a client side wants to open and read the email, the client side computer uses Internet Message Access Protocol (IMAP), Post Office Protocol (POP3), Hypertext Transfer Protocol (HTTP), or other method to access the email from the email servers 212 via the Internet (214). Once the email is opened, the tracker associated with the email sends a message including an HTTP request to the CDN (220). As discussed above with respect to FIG. 1, the message includes the EID (for example, EID "12345") and the HTTP request includes an IP address associated with the client side computer. If the email is opened by the intended recipient from a safe location, the CDN forwards the message including the HTTP request to the content servers 202. The fraud detection system 105 verifies that the message originates from the safe location by processing log files in the log databases 206. The content servers 202 then fulfill the HTTP request by allowing the client side computer to download the requested content using HTTP via the CDN and present the content in the email (222). If the email is opened by a fraudster from an unsafe location (e.g. from a blocked IP address as discussed above with respect to FIG. 1), the HTTP request is blocked by the CDN or a web server. In some implementations, the CDN sends a block notice to the content servers 202. In some implementations, a component in the fraud detection system 105 such as the fraud detector 101 identifies that the HTTP request was blocked by the CDN and detects a potential security breach by processing the log files stored in the log databases 206 or other persistent data storage system, such as flat files. The log files may include information about the location, time, and duration that the email has been improperly opened. The content servers 202 then do not fulfill the blocked request. The log files may be generated by the CDN, the content servers, or a combination of both.

In some implementations, the fraud detection system receives a periodic report that includes IP addresses and EIDs of emails that have been opened during the period. The report can be generated over different time periods, for example, the report can be generated in near real time (e.g., less than 5 seconds), hourly, daily, or weekly. The report can be provided by a search component that has access to the log files.

In some implementations, the search component can process the log files that were generated during the period (e.g., over the last day). When the search component identifies a log message that indicates that a request including the EID was blocked, the EID is included in the report. Other information can also be included, such as, the IP address that was the origin of the request, a name of a physical location and/or a name of a service provider associated with the IP address. In some implementations, the report may include information that identifies why the request was blocked. For example, the report may indicate that the request was received from an OFAC country, or from a service provider/location known to be associated with fraud.

In some implementations, the daily report can remove duplicate entries. For example, if a request including an EID is blocked multiple times, the report may only include the EID once. In other implementations, the report may include the count of the number of times a request including the EID was blocked.

Upon the potential security breach being detected, the fraud detection system 105 generates an alert 122 identifying the intended recipient (e.g., the user 110) of the email. The fraud detection system 105 accesses the EID databases 204 to retrieve the personally identifiable information of the user 110 using the EID included in the received message or using the EIDs in the daily report. In some implementations, the fraud detection system 105 identifies one or more alternative channels to communicate with the user 110 based on the retrieved user information. The fraud detection system 105 may also trigger an alert within the company or organization, for example, by sending a message to a fraud department, customer service representative, etc.

Figure 3:
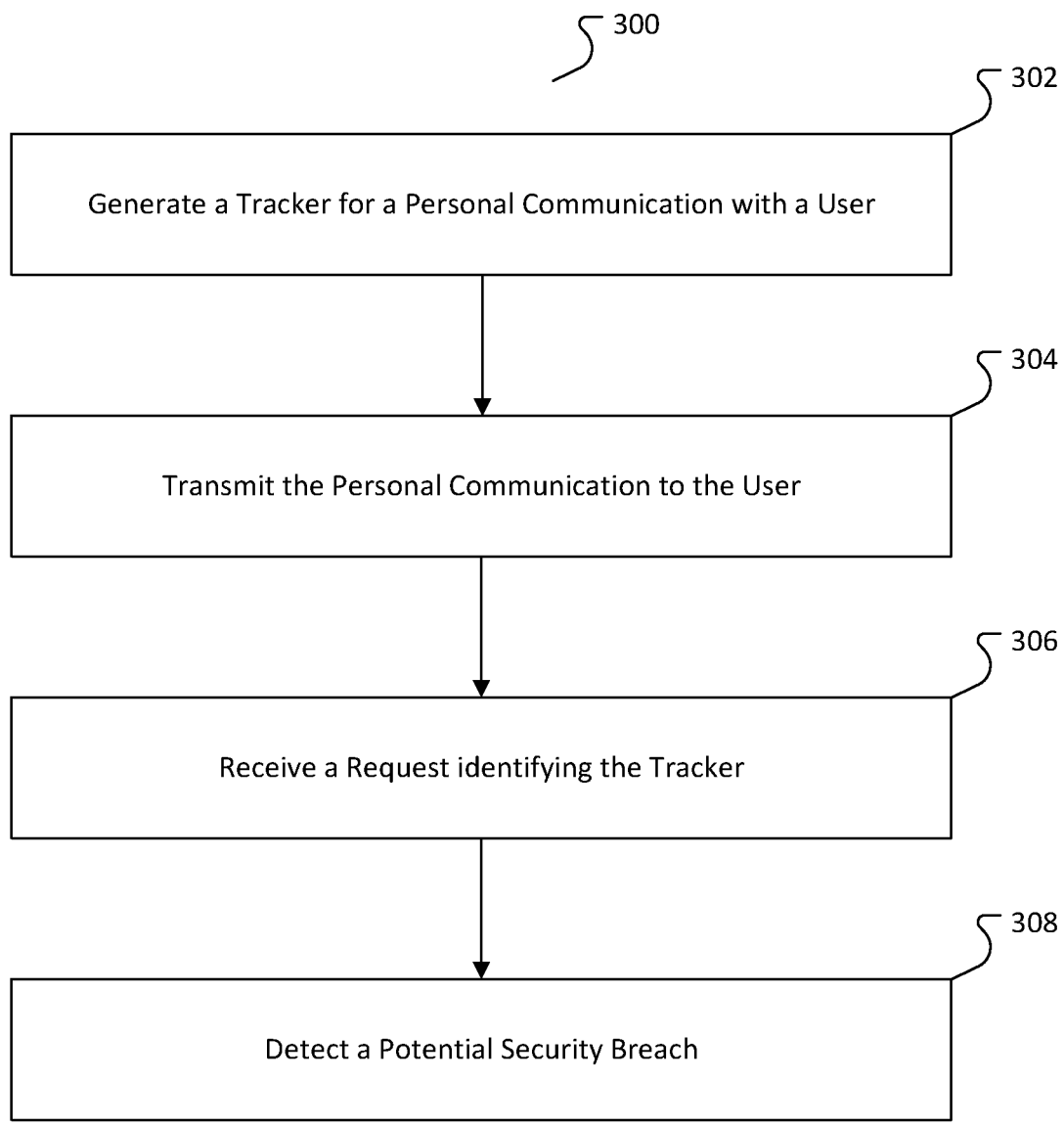
FIG. 3 illustrates a flowchart of an example of a process for early fraud detection.

The fraud detection system 105 transmits the alert 122 via the one or more alternative channels to the user 110 or a relevant person/organization. The one or more alternative channels may include short message service (SMS) text message, multimedia message service (MMS) message, telephone call, Voice-over-IP (VoIP) communication, social media platform notification systems, mobile phone push notifications, other mobile device notification systems, and email to a secondary email address. The fraud detection system 105 can also temporarily suspend the email account that has been compromised to prevent the fraudster from performing other improper tasks. The fraud detection system 105 can also suggest an action list including one or more actions to the user 110 via the one or more alternative channels to remedy the potential security breach. For example, the one or more actions may include changing passwords, changing security questions, deleting email-related traces from temporary files, establishing a secondary e-mail address, enabling two factor authentication, and notifying authorities FIG. 3 is a flowchart 300 of an example of a process for early fraud detection. The process may be performed by one or more computer systems, for example, the content servers 202 of FIG. 2.

The process 300 includes generating 302 a tracker for a personal communication with a user. For example, the tracker may be generated by the tracking generator 103 of FIG. 1. The personal communication can be an email or a link to a web page. The tracker can include a unique identifier (ED), wherein the EID does not include personally identifiable information of the user. The personal communication can include a reference to a resource located on a computer system or be configured to send a message to the computer system in response to the personal communication being opened. Upon the tracker being generated, information associating the tracker with the user can be stored in a database. The information can include the EID and personally identifiable information of the user associated with the EID.

The process 300 includes transmitting 304 the personal communication to a user. The personal communication can be transmitted via a network using different mail transfer protocols.

The process 300 includes receiving 306 a request identifying the tracker, wherein the request originates from an address. The request can be an HTTP request sent by the tracker once the email is opened. The address can be an IP address.

The process 300 includes detecting 308 a potential security breach based on the address. For example, the process can detect the potential security breach by identifying a provider known to be associated with security breaches based on the address or identifying a country of origin based on the address. The process can also detect the potential security breach by identifying that the request including the tracker was blocked by processing log files associated with a content server. In addition, the process can identify that the user is a high value target and sending an alert to a fraud detection unit.

In response to detecting the potential security breach, the process can access personally identifiable information about the user from the database using the unique identifier. The process can further identify one or more communication channels based on the personally identifiable information. The process can then transmit the alert to the user or a customer service representative via the one or more communication channels and suggest one or more actions to the user to remedy the potential security breach. The one or more actions can include changing passwords, changing security questions, deleting email-related traces from temporary files, establishing a secondary email address, enabling two factor authentication, and notifying authorities.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A computer-implemented method comprising:
  generating, by a computer system, a tracker for a personal electronic communication with a user wherein, when the personal electronic communication is accessed, the tracker is configured to automatically transmit a request in response to the personal electronic communication being accessed, wherein the request is for an object for presentation in the personal electronic communication, wherein the object, when presented in the personal electronic communication, is not readily visible to a user, and wherein the request includes:
- location data indicating a location at which the personal electronic communication was accessed; and
- a unique identifier that identifies the personal electronic communication and corresponds to identifiable information of the user that is stored in one or more databases distributed over a network;

transmitting the personal electronic communication with the tracker to a device of the user over a first communications channel;

determining that the request transmitted by the tracker has been blocked by one or more of a web server or a content delivery network by processing data records generated by the one or more of a web server or a content delivery network, the data records including the location data; and in response to determining that the request has been blocked:
- detecting, by the computer system, a potential security breach based on the location data, and
- transmitting an alert to the device over a second communications channel that is different than the first communications channel.

2. The method of claim 1, wherein the unique identifier does not include personally identifiable information of the user.

3. The method of claim 1, wherein the personal electronic communication includes an email.

4. The method of claim 1, wherein the personal electronic communication includes a link to a web page.

5. The method of claim 1, further comprising:
upon generating the tracker for the personal electronic communication with the user, storing information associating the tracker with the user in the one or more databases, the information including the unique identifier and the identifiable information of the user associated with the unique identifier.

6. The method of claim 1, wherein the request was blocked based on a comparison of the location with one or more predetermined locations.

7. The method of claim 1, wherein detecting the potential security breach includes identifying a provider known to be associated with security breaches based on the location data or identifying a country of origin based on the location data.

8. The method of claim 1, wherein the second communications channel includes one or more of: a short message service text message channel or a multimedia message service message channel.

9. The method of claim 1, wherein transmitting an alert includes accessing, from the one or more databases, the identifiable information of the user by using the unique identifier transmitted by the tracker, the unique identifier not including the personally identifiable information of the user.

10. The method of claim 1, wherein detecting the potential security breach includes identifying that the user is a high value target and sending an alert to a fraud detection unit.

11. The method of claim 1, further comprising:
in response to detecting the potential security breach:
- accessing the identifiable information about the user from the one or more databases using the unique identifier;
- identifying the second communications channel based on the identifiable information; and
- suggesting one or more actions to the user to remedy the potential security breach.

12. The method of claim 11, wherein the one or more actions include changing passwords, changing security questions, deleting email-related traces from temporary files, establishing a secondary email address, enabling two factor authentication, and notifying authorities.

13. A non-transitory computer storage medium encoded with computer program instructions that when executed by one or more computers cause the one or more computers to perform operations comprising:
generating a tracker for a personal electronic communication with a user wherein, when the personal electronic communication is accessed, the tracker is configured to automatically transmit a request in response to the personal electronic communication being accessed, wherein the request is for an object for presentation in the personal electronic communication, wherein the object, when presented in the personal electronic communication, is not readily visible to a user, and wherein the request includes:
- location data indicating a location at which the personal electronic communication was accessed; and
- a unique identifier that identifies the personal electronic communication and corresponds to identifiable information of the user that is stored in one or more databases distributed over a network;

transmitting the personal electronic communication with the tracker to a device of the user over a first communications channel;

determining that the request transmitted by the tracker has been blocked by one or more of a web server or a content delivery network by processing data records generated by the one or more of a web server or a content delivery network, the data records including the location data; and in response to determining that the request has been blocked:
- detecting a potential security breach based on the location data, and
- transmitting an alert to the device over a second communications channel that is different than the first communications channel.

14. The medium of claim 13, wherein the unique identifier does not include personally identifiable information of the user.

15. The medium of claim 13, wherein the personal electronic communication includes an email or a link to a web page.

16. The medium of claim 13, wherein the personal electronic communication includes a reference to a resource located on a computer system or is configured to send a message to the computer system in response to the personal electronic communication being accessed.

17. The medium of claim 13, wherein the operations further comprise:
upon generating the tracker for the personal electronic communication with the user, storing information associating the tracker with the user in the one or more databases, the information including the unique identifier and the identifiable information of the user associated with the unique identifier.

18. The medium of claim 13, wherein the request was blocked based on a comparison of the location with one or more predetermined locations.

19. The medium of claim 13, wherein detecting the potential security breach includes identifying a provider known to be associated with security breaches based on the location data or identifying a country of origin based on the location data.

20. The medium of claim 13, wherein the second communications channel includes one or more of: a short message service text message channel or a multimedia message service message channel.

21. The medium of claim 13, wherein transmitting an alert includes accessing, from the one or more databases, the identifiable information of the user by using the unique identifier transmitted by the tracker, the unique identifier not including the personally identifiable information of the user.

22. The medium of claim 13, wherein detecting the potential security breach includes identifying that the user is a high value target and sending an alert to a fraud detection unit.

23. The medium of claim 13, the operations further comprising:
in response to detecting the potential security breach:
accessing the identifiable information about the user from the one or more databases using the unique identifier;
identifying the second communications channel based on the identifiable information; and
suggesting one or more actions to the user to remedy the potential security breach.

24. The medium of claim 23, wherein the one or more actions include changing passwords, changing security questions, deleting email-related traces from temporary files, establishing a secondary email address, enabling two factor authentication, and notifying authorities.

25. A system comprising:
a tracking generator programmed to generate a tracker for a personal electronic communication with a user;
a processing agent programmed to:
transmit the personal electronic communication and the tracker to a user device of the user over a first communications channel, wherein when the personal electronic communication is accessed, the tracker is configured to automatically transmit a request in response to the personal electronic communication being accessed, wherein the request is for an object for presentation in the personal electronic communication, wherein the object, when presented in the personal electronic communication, is not readily visible to a user, and wherein the request includes:
location data indicating a location at which the personal electronic communication was accessed; and
a unique identifier that identifies the personal electronic communication and corresponds to identifiable information of the user that is stored in one or more databases distributed over a network; and
determining that the request transmitted by the tracker has been blocked by one or more of a web server or a content delivery network by processing data records generated by the one or more of a web server or a content delivery network, the data records including the location data; and
a fraud detector programmed to, in response to determining that the request has been blocked:
detect a potential security breach based on the location data and, in response to detecting the potential security breach, and
transmit an alert to the device over a second communications channel that is different than the first communications channel.

26. The system of claim 25, wherein the unique identifier does not include personally identifiable information of the user.

27. The system of claim 25, wherein the personal electronic communication includes an email or a link to a web page.

28. The system of claim 25, wherein the personal electronic communication includes a reference to a resource located on a computer system or is configured to send a message to the computer system in response to the personal electronic communication being accessed.

29. The system of claim 25, wherein the processing agent is further programmed to:
store information associating the tracker with the user in the one or more databases database, the information including the unique identifier and the identifiable information of the user associated with the unique identifier.

30. The system of claim 25, wherein the request was blocked based on a comparison of the location with one or more predetermined locations.

31. The system of claim 25, wherein detecting the potential security breach includes identifying a provider known to be associated with security breaches based on the location data or identifying a country of origin based on the location data.

32. The system of claim 25, wherein the second communications channel includes one or more of: a short message service text message channel or a multimedia message service message channel.

33. The system of claim 25, wherein transmitting an alert includes accessing, from the one or more databases, the identifiable information of the user by using the unique identifier transmitted by the tracker, the unique identifier not including the personally identifiable information of the user.

34. The system of claim 25, wherein detecting the potential security breach includes identifying that the user is a high value target and sending an alert to a fraud detection unit.

35. The system of claim 25, wherein:
in response to detecting the potential security breach using the fraud detector, the processing agent is further programmed to:
access the identifiable information about the user from the one or more databases using the unique identifier;
identify the second communications channel based on the identifiable information; and
suggest one or more actions to the user to remedy the potential security breach.

36. The system of claim 35, wherein the one or more actions include changing passwords, changing security questions, deleting email-related traces from temporary files, establishing a secondary email address, enabling two factor authentication, and notifying authorities.

* * * * *